(12) United States Patent
Hegna et al.

(10) Patent No.: US 11,480,701 B2
(45) Date of Patent: Oct. 25, 2022

(54) NON-UNIFORM TOWING PATTERNS IN MARINE GEOPHYSICAL SURVEYS

(71) Applicant: PGS Geophysical AS, Oslo (NO)

(72) Inventors: Stian Hegna, Leiden (NL); Tilman Kluver, Leiden (NL); Jostein Lima, Oslo (NO)

(73) Assignee: PGS Geophysical AS, Oslo (NO)

( * ) Notice: Subject to any disclaimer, the term of this patent is extended or adjusted under 35 U.S.C. 154(b) by 428 days.

(21) Appl. No.: 16/154,876

(22) Filed: Oct. 9, 2018

(65) Prior Publication Data

US 2019/0113645 A1    Apr. 18, 2019

Related U.S. Application Data

(60) Provisional application No. 62/571,958, filed on Oct. 13, 2017.

(51) Int. Cl.
*G01V 1/38* (2006.01)
*G01V 1/00* (2006.01)

(52) U.S. Cl.
CPC ............ *G01V 1/3826* (2013.01); *G01V 1/003* (2013.01); *G01V 1/3808* (2013.01); *G01V 2200/14* (2013.01)

(58) Field of Classification Search
CPC .... G01V 1/3826; G01V 1/003; G01V 1/3808; G01V 2200/14
See application file for complete search history.

(56) References Cited

U.S. PATENT DOCUMENTS 4,974,212 A * 11/1990 Sheiman ................ G01V 1/362
367/21
5,402,391 A * 3/1995 Cordsen .................. G01V 1/20
367/56

(Continued)

FOREIGN PATENT DOCUMENTS

EP    2508918    10/2012
EP    3118655    1/2017

(Continued)

OTHER PUBLICATIONS

International Search Report and Written Opinion in PCT Appl. No PCT/EP2018/077915 dated Feb. 7, 2019, 15 pages.

(Continued)

*Primary Examiner* — Isam A Alsomiri
*Assistant Examiner* — Vikas Atmakuri

(57) ABSTRACT

Techniques are disclosed relating to performing marine surveys with non-uniform spacing of survey elements in a cross-line direction. This may include, for example, performing a survey pass in a multi-pass survey by towing a plurality of sources and sensors in a towing pattern with non-uniform spacing between adjacent ones of the sources. In some embodiments, the non-uniform spacing between adjacent ones of the sources is determined based on a common mid-point (CMP) spacing parameter for the survey pass in the cross-line direction. The spacing parameter may relate, for example, to difference in average CMP spacing for different parts of the survey spread, variance in CMP spacing, and/or width of the survey spread for which a threshold CMP spacing distance is satisfied. In various embodiments, the disclosed techniques may improve survey resolution and/or accuracy and may require a smaller number of survey passes and/or a reduced amount of survey equipment relative to traditional techniques.

18 Claims, 10 Drawing Sheets

(56) References Cited

U.S. PATENT DOCUMENTS

| | | | | |
|---|---|---|---|---|
| 5,924,049 | A * | 7/1999 | Beasley | G01V 1/006 702/17 |
| 6,021,379 | A * | 2/2000 | Duren | G01V 1/282 367/73 |
| 6,028,822 | A | 2/2000 | Lansley et al. | |
| 6,665,618 | B1 * | 12/2003 | Thomas | G01V 1/003 702/14 |
| 7,969,818 | B2 * | 6/2011 | Burren | G01V 1/3808 367/21 |
| 8,897,094 | B2 * | 11/2014 | Eick | G01V 1/3826 367/17 |
| 9,188,692 | B2 * | 11/2015 | Haumonte | G01V 1/3835 |
| 10,379,256 | B2 * | 8/2019 | Adams | G01V 3/165 |
| 10,627,534 | B2 * | 4/2020 | Bernitsas | G01V 1/3808 |
| 2008/0144436 | A1 * | 6/2008 | Pickering | G01V 1/30 367/21 |
| 2009/0274004 | A1 * | 11/2009 | Ferber | G01V 1/3808 367/20 |
| 2011/0305106 | A1 * | 12/2011 | Eick | G01V 1/20 367/17 |
| 2011/0305113 | A1 * | 12/2011 | Eick | G01V 1/20 367/56 |
| 2012/0257474 | A1 * | 10/2012 | Cambois | G01V 1/3808 367/16 |
| 2013/0322205 | A1 * | 12/2013 | Widmaier | G01V 1/3808 367/16 |
| 2014/0269173 | A1 * | 9/2014 | Coste | G01V 1/006 367/15 |
| 2014/0286128 | A1 * | 9/2014 | Grimm | G01V 1/28 367/24 |
| 2014/0376331 | A1 * | 12/2014 | Howieson | G01V 1/3808 367/20 |
| 2016/0003959 | A1 * | 1/2016 | Bowman | G01V 1/3808 367/15 |
| 2017/0017005 | A1 * | 1/2017 | Siliqi | G01V 1/3808 |
| 2017/0059727 | A1 * | 3/2017 | Eick | G01V 1/003 |
| 2017/0115419 | A1 | 4/2017 | van Groenestijn | |
| 2017/0199292 | A1 * | 7/2017 | Tonnessen | G01V 1/3861 |
| 2017/0235003 | A1 * | 8/2017 | Elboth | G01V 1/003 367/17 |
| 2018/0164455 | A1 * | 6/2018 | Elboth | G01V 1/364 |
| 2018/0321406 | A1 * | 11/2018 | Strand | G01V 1/3861 |
| 2019/0219717 | A1 * | 7/2019 | Godoy | G01V 1/3861 |

FOREIGN PATENT DOCUMENTS

| | | | |
|---|---|---|---|
| EP | 3206052 | 8/2017 | |
| GB | 2545542 A * | 6/2017 | G01V 1/003 |
| WO | WO-0225315 A2 * | 3/2002 | G01V 1/3808 |
| WO | 2011/156491 | 12/2011 | |
| WO | 2014/152125 | 9/2014 | |
| WO | WO-2018067016 A1 * | 4/2018 | G01V 1/006 |

OTHER PUBLICATIONS

Examination Report in EP Application 18789044.7-1001 dated Jun. 15, 2021 (EPO, 9 pages).

* cited by examiner

Perform a survey pass in a multi-pass marine geophysical survey using a towing pattern for a plurality of sources and a plurality of sensors, wherein the towing pattern has a non-uniform cross-line spacing between adjacent ones of the sources and wherein the non-uniform spacing exhibits a common mid-point (CMP) spacing attribute for the survey pass in a cross-line direction
810

Record sensor measurements from ones of the plurality of sensors during the survey pass
820

*Fig. 8A*

Determine a number of sources and sensors in a towing pattern for a geophysical survey pass in a multi-pass survey
830

Determine a non-uniform cross-line spacing between adjacent ones of the sources in the survey pass based on a common mid-point (CMP) spacing parameter for the survey pass in a cross-line direction
840

*Fig. 8B*

Perform a survey pass in a multi-pass marine geophysical survey using a towing pattern for a plurality of sources and a plurality of sensors, wherein the towing pattern has a non-uniform cross-line spacing between adjacent ones of the sensors and wherein the non-uniform spacing exhibits a common mid-point (CMP) spacing attribute for the survey pass in a cross-line direction
910

Record sensor measurements from ones of the plurality of sensors during the survey pass
920

*Fig. 9A*

Determine a number of sources and sensors in a towing pattern for a geophysical survey pass in a multi-pass survey
930

Determine a non-uniform cross-line spacing between adjacent ones of the sensors in the survey pass based on a common mid-point (CMP) spacing parameter for the survey pass in a cross-line direction
940

*Fig. 9B*

NON-UNIFORM TOWING PATTERNS IN MARINE GEOPHYSICAL SURVEYS

CROSS-REFERENCE TO RELATED APPLICATIONS

This application claims priority to U.S. Provisional Patent Application No. 62/571,958, filed on Oct. 13, 2017, which is hereby incorporated by reference in its entirety.

BACKGROUND

Geophysical surveys are often used for oil and gas exploration in geophysical formations, which may be located below marine environments. Various types of signal sources and geophysical sensors may be used in different types of geophysical surveys. Seismic geophysical surveys, for example, are based on the use of acoustic waves. Electromagnetic geophysical surveys, as another example, are based on the use of electromagnetic waves. In some surveys, a survey vessel may tow one or more sources (e.g., air guns, marine vibrators, electromagnetic sources, etc.) and one or more streamers along which a number of sensors (e.g., hydrophones and/or geophones and/or electromagnetic sensors) are located.

During the course of a geophysical survey, the various sensors may collect data indicative of geological structures, which may be analyzed, e.g., to determine the possible locations of hydrocarbon deposits. In 4D surveying techniques, surveys may be performed at a given location at different times, e.g., to determine changes to hydrocarbon deposits. Traditionally, marine surveys have been performed with nominally uniform spacing between survey elements (e.g., between sources or between streamers). Generally, achieving desired coverage (e.g., in order to generate images of subsea formations at a desired image resolution) while performing as few survey passes as possible may be desirable, to reduce survey time and costs.

BRIEF DESCRIPTION OF THE DRAWINGS

FIGS. 8A and 8B are flow diagrams of exemplary methods associated with non-uniform spacing of survey sources, according to some embodiments.

FIGS. 9A and 9B are flow diagrams of exemplary methods associated with non-uniform spacing of survey sensors, according to some embodiments.

Figure 1:
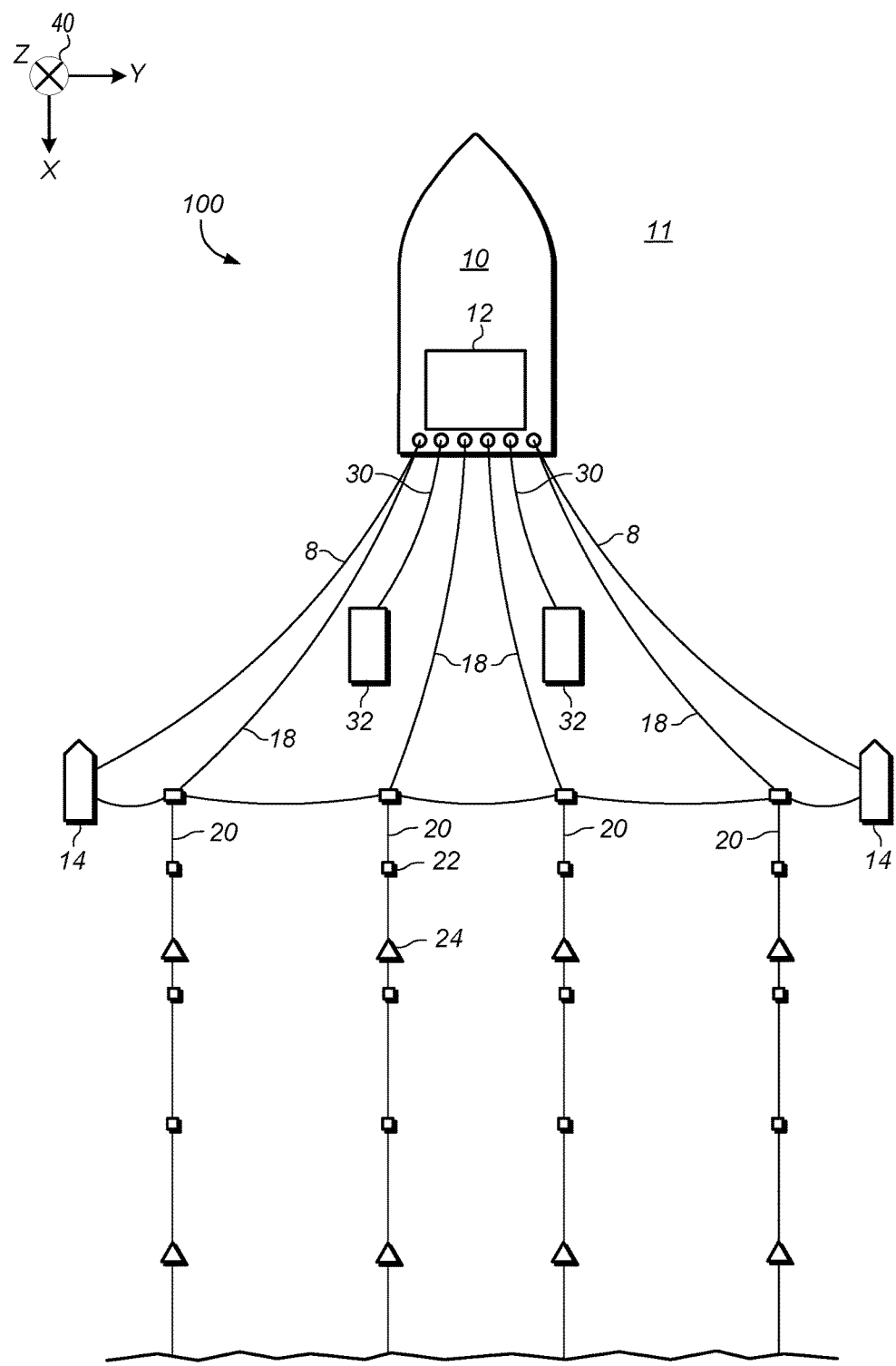
FIG. 1 illustrates an exemplary marine geophysical survey system, according to some embodiments.

This specification includes references to various embodiments, to indicate that the present disclosure is not intended to refer to one particular implementation, but rather a range of embodiments that fall within the spirit of the present disclosure, including the appended claims. Particular features, structures, or characteristics may be combined in any suitable manner consistent with this disclosure.

Within this disclosure, different entities (which may variously be referred to as "units," "circuits," other components, etc.) may be described or claimed as "configured" to perform one or more tasks or operations. This formulation—[entity] configured to [perform one or more tasks]— is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. An "apparatus configured to steer a streamer" is intended to cover, for example, a module that performs this function during operation, even if the corresponding device is not currently being used (e.g., when its battery is not connected). Thus, an entity described or recited as "configured to" perform some task refers to something physical, such as a device, circuit, memory storing program instructions executable to implement the task, etc. This phrase is not used herein to refer to something intangible.

The term "configured to" is not intended to mean "configurable to." An unprogrammed mobile computing device, for example, would not be considered to be "configured to" perform some specific function, although it may be "configurable to" perform that function. After appropriate programming, the mobile computing device may then be configured to perform that function.

Reciting in the appended claims that a structure is "configured to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke Section 112(f) during prosecution, it will recite claim elements using the "means for" [performing a function] construct.

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

DETAILED DESCRIPTION

Figure 3A:
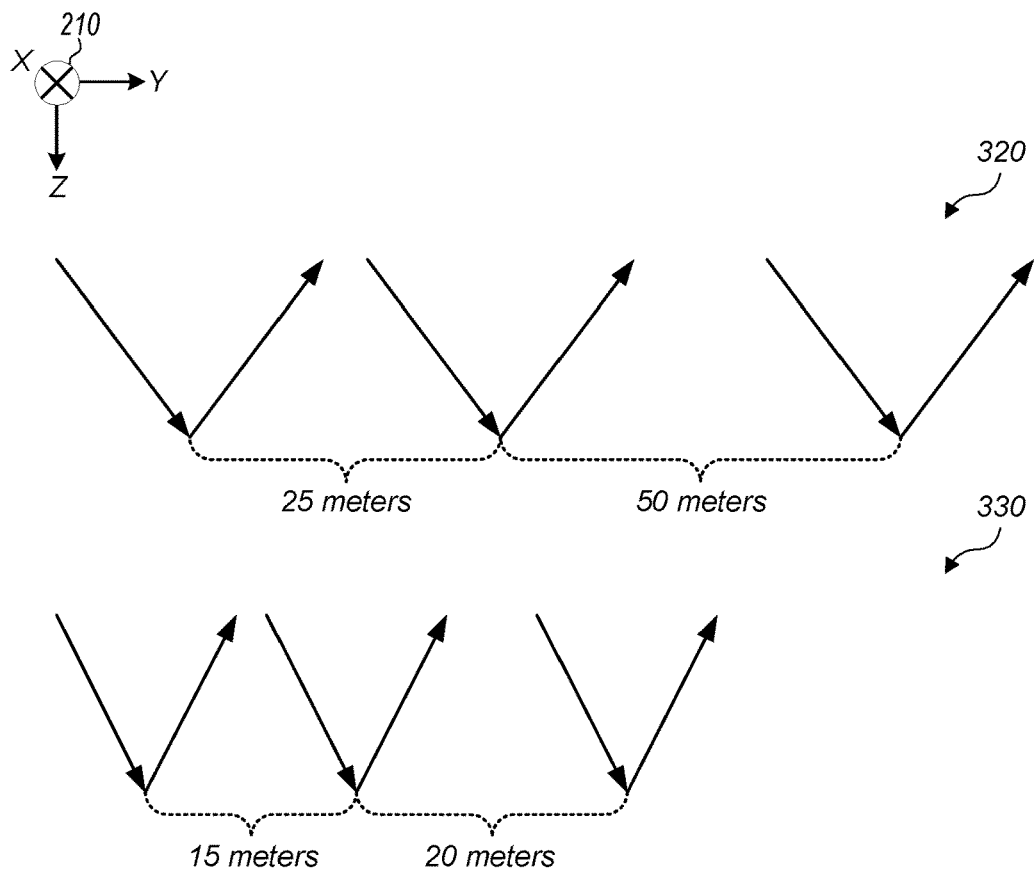
FIGS. 3A and 3B illustrate examples of CMP spacing parameters for adjacent Common Mid-Point (CMP) locations, according to some embodiments.
Figure 3B:
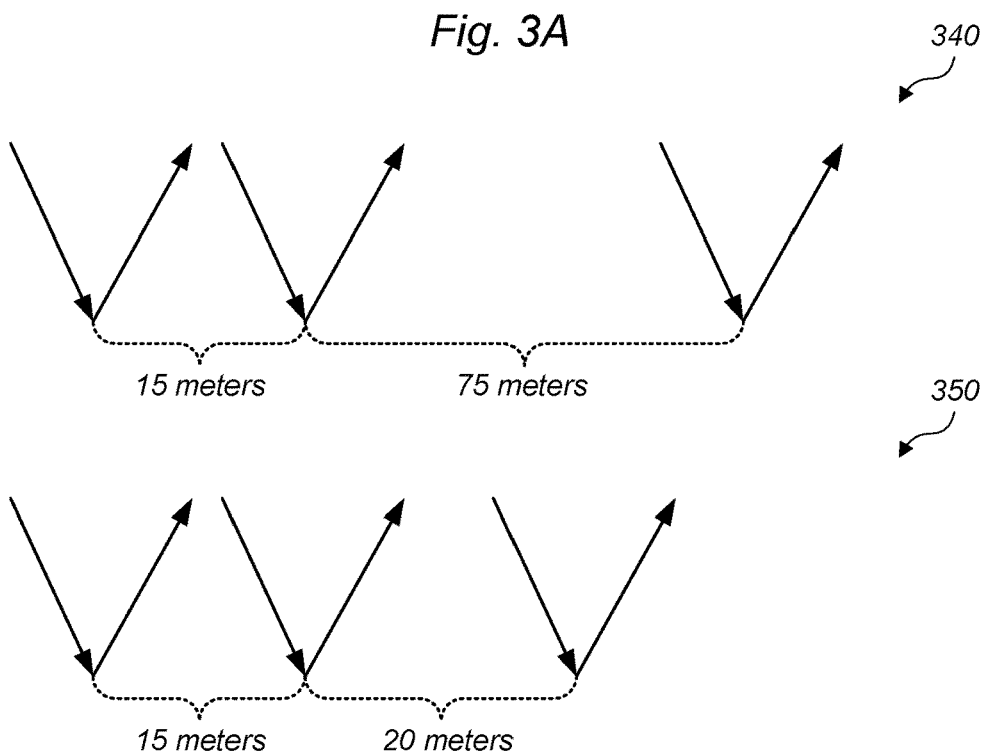
Figure 4:
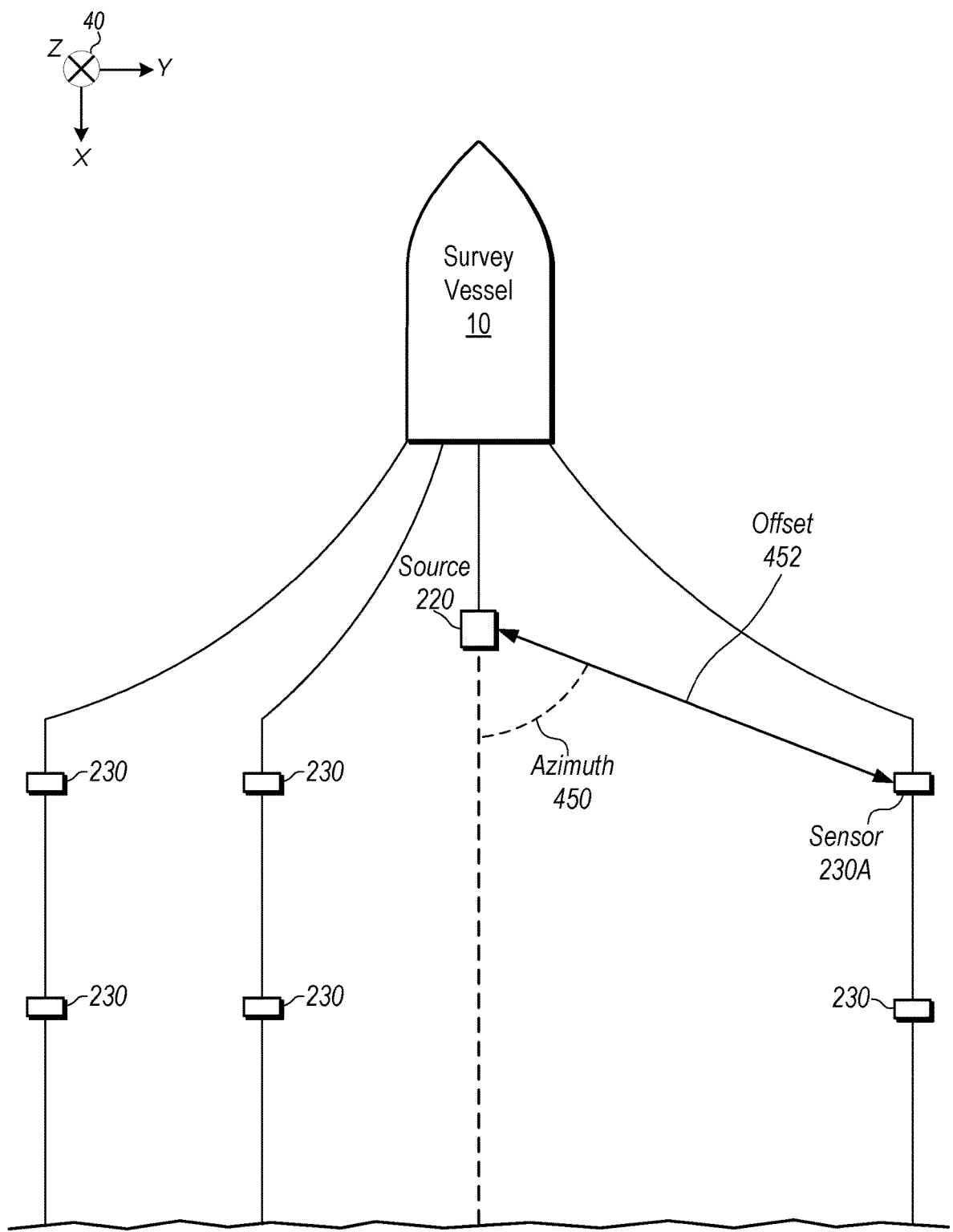
FIG. 4 illustrates an exemplary source-sensor azimuth angle upon which one or more parameters for non-uniform spacing may be based, according to some embodiments.
Figure 5:
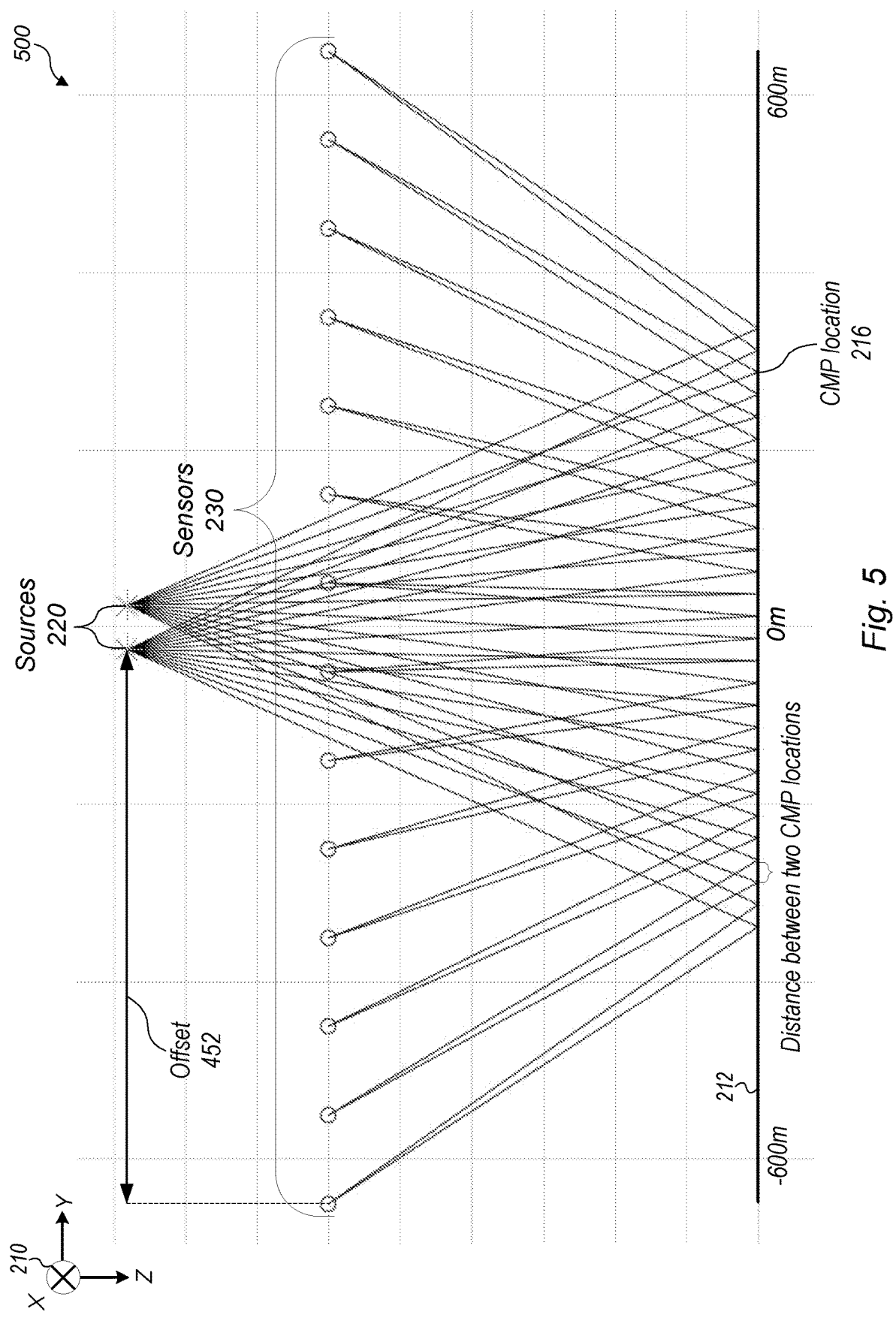
FIG. 5 illustrates an exemplary towing pattern with uniform cross-line spacing of two sources and fourteen sensors, according to some embodiments.
Figure 6:
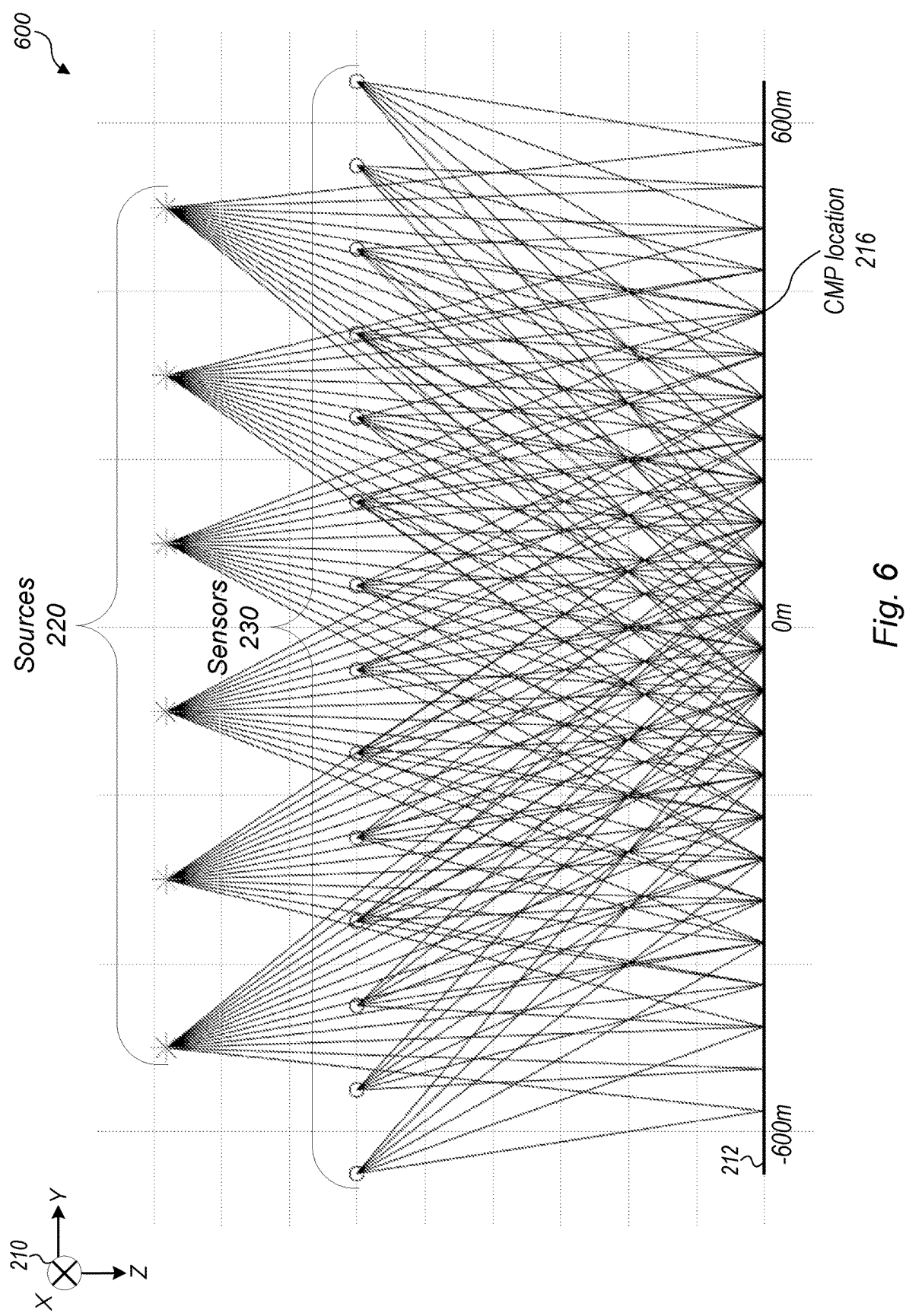
FIG. 6 illustrates an exemplary towing pattern with uniform cross-line spacing of six sources and fourteen sensors, according to some embodiments.

This disclosure initially describes, with reference to FIG. 1, an overview of a geophysical survey system. Towing patterns with non-uniform cross-line spacing of sources and sensors are discussed with reference to FIGS. 2 and 7. FIGS. 3A and 3B facilitate the discussion of average spacing and variance in spacing of CMP locations. FIG. 4 illustrates an exemplary source-sensor azimuth in a seismic survey. FIGS. 5 and 6 illustrate various configurations of towing patterns with uniform source and sensor cross-line spacing in a seismic survey. FIGS. 8A and 8B are exemplary methods and FIG. 9 describes an exemplary computing device.

Overview of a Seismic Geophysical Survey

Referring to FIG. 1, a marine geophysical survey system 100 is shown (not necessarily to scale), according to some embodiments. In the illustrated embodiment, system 100 includes survey vessel 10, sources 32, source cables 30, paravanes 14, and streamers 20 (streamers 20 are shown truncated at the bottom of FIG. 1.). In some embodiments, survey vessel 10 may be configured to move along a surface of a body of water 11 such as a lake or ocean. In the illustrated embodiment, survey vessel 10 tows streamers 20, sources 32, and paravanes 14, which may be used to provide a desired amount of spread among streamers 20. In other embodiments, streamers 20 with sources 32 may be towed by a separate vessel (not shown), rather than survey vessel 10.

In some embodiments, streamers 20 may include sensors 22 (e.g., hydrophones, geophones, electromagnetic sensors, etc.). Streamers 20 may further include streamer steering devices 24 (also referred to as "birds") which may provide selected lateral and/or vertical forces to streamers 20 as they are towed through the water, typically based on wings or hydrofoils that provide hydrodynamic lift. In some embodiments, streamers 20 may further include tail buoys (not shown) at their respective back ends.

In some embodiments, survey vessel 10 may include equipment, shown generally at 12 and for convenience collectively referred to as a "recording system." In some embodiments, recording system 12 may include devices such as a data recording unit (not shown separately) for making a record of signals generated by various geophysical sensors. Recording system 12 may also include navigation equipment (not shown separately), which may be configured to control, determine, and record the geodetic positions of: survey vessel 10, sources 32, streamers 20, sensors 22, etc., according to some embodiments. In the illustrated embodiment, streamers 20 are coupled to survey vessel 10 via cables 18.

In the illustrated plot, an xy-plane 40 is shown of a Cartesian coordinate system having three orthogonal, spatial coordinate axes labeled x, y and z. The coordinate system is used to specify orientations and coordinate locations within the body of water 11. The x-direction is parallel to the length of the streamer (or a specified portion thereof when the length of the streamer is curved) and is referred to as the "in-line" direction. The y-direction is perpendicular to the x-axis and substantially parallel to the surface of the body of water 11 and is referred to as the cross-line direction. The z-direction is perpendicular to the xy-plane (i.e., perpendicular to the surface of the body of water 11) with the positive z-direction pointing downward away from the surface of the body of water.

Collectively, the survey data that is recorded by recording system 12 may be referred to as "marine survey input data", according to some embodiments. In embodiments where the survey being performed is a seismic survey, the recorded data may be referred to more specifically as "marine survey seismic data," although the marine survey input data may encompass survey data generated by other techniques. In various embodiments, the marine survey input data may not necessarily include every observation captured by sensors 22 (e.g., the raw sensor data may be filtered before it is recorded). Also, in some embodiments, the marine survey input data may include data that is not necessarily indicative of subsurface geology, but may nevertheless be relevant to the circumstances in which the survey was conducted (e.g., environmental data such as water temperature, water current direction and/or speed, salinity, etc.). In some embodiments, Geodetic position (or "position") of the various elements of system 100 may be determined using various devices, including navigation equipment such as relative acoustic ranging units and/or global navigation satellite systems (e.g., a global positioning system or "GPS").

Various items of information relating to geophysical surveying (e.g., raw data collected by sensors and/or marine survey input data generally, or products derived therefrom by the use of post-collection processing such as the techniques discussed below, to the extent these differ in various embodiments), may be embodied in a "geophysical data product." A geophysical data product may comprise a computer-readable, non-transitory medium having geophysical data stored on the medium, including, e.g., raw streamer data, processed streamer data, two- or three-dimensional maps based on streamer data, or other suitable representations. Some non-limiting examples of computer-readable media may include tape reels, hard drives, CDs, DVDs, flash memory, print-outs, etc., although any tangible computer-readable medium may be employed to create the geophysical data product. In some embodiments, raw analog data from streamers may be stored in the geophysical data product. In other instances, as noted above, the data may first be digitized and/or conditioned prior to being stored in the geophysical data product. In yet other instances, the data may be fully processed into a two- or three-dimensional map of the various geophysical structures, or another suitable representation, before being stored in the geophysical data product. The geophysical data product may be manufactured during the course of a survey (e.g., by equipment on a vessel) and then, in some instances, transferred to another location for geophysical analysis, although analysis of the geophysical data product may occur contemporaneously with survey data collection. In other instances, the geophysical data product may be manufactured subsequent to survey completion, e.g., during the course of analysis of the survey.

As used herein, the term "non-uniform" means that, for a set of survey elements distributed in a particular reference direction (e.g., the cross-line direction), distances between at least one element and the two nearest adjacent elements are different. For example, consider a set of three elements A, B, and C where A and B are adjacent in the cross-line direction and B and C are also adjacent in the crossline direction. If the distance between A and B and the distance between B and C is the same, then the spacing of the set A, B, C is uniform. If the distance between A and B and the distance between B and C is different, however, then the spacing of the set A, B, C is non-uniform. In some embodiments, non-uniform spacings may have the same pattern in different parts of a survey spread. For example, the survey spread may be mirrored around the line of tow of the vessel, e.g., such that the right side of the spread mirrors the left side, but each side is non-uniform. Note that, while a given towing pattern may have nominal positions of sources that are non-uniform, ocean currents or equipment malfunctions may move survey elements from their desired positions. Therefore, discussions of non-uniform towing patterns are intended to encompass such situations. Similarly, a survey pattern with nominally uniform spacing is not non-uniform, as the term is used herein, simply because of errors in maintaining the desired nominal spacing.

The term "strictly-non-uniform," as used herein, means that, for a set of survey elements and a particular reference direction (e.g., the cross-line direction), distances between elements in all pairs of adjacent elements in the set are different. The term "sparsely-non-uniform," as used herein, means that, in the cross-line direction, the distance between a first pair of adjacent survey elements is at least twice the distance between another pair of adjacent survey elements in the cross-line direction. Note that, in some embodiments, the distance between the elements in the first pair may be 3, 4, 5, etc. times the distance between the elements in another pair of adjacent elements.

In various embodiments, non-uniform spacing may be advantageous, for example, in widening the effective coverage of the survey spread in the cross-line direction. This may in turn reduce the number of passes needed for a given survey. Non-uniform spacing of survey elements in a towing pattern may also improve the resolution and/or accuracy of images produced from one or more passes using the towing pattern in a multi-pass survey.

An Exemplary Towing Pattern with Non-Uniform Source and Sensor Spacing

Figure 2:
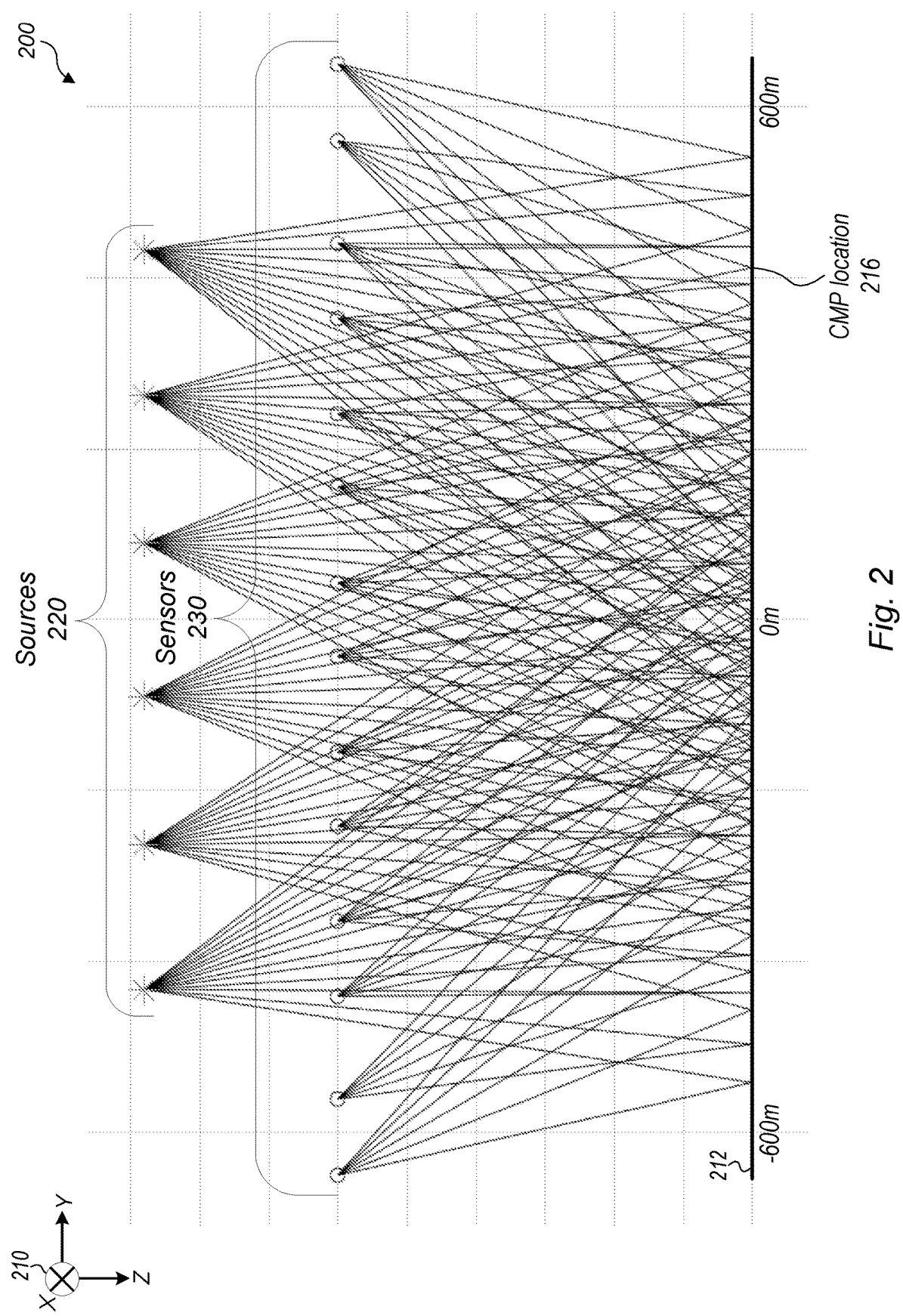
FIG. 2 illustrates an exemplary towing pattern with non-uniform cross-line spacing of six sources and fourteen sensors, according to some embodiments.

FIG. 2 illustrates an exemplary towing pattern with non-uniform cross-line spacing of six sources and fourteen sensors, according to some embodiments. In the illustrated embodiment, towing pattern 200 includes sources 220 and sensors 230 which are towed above a geological surface 212. In some embodiments, sensors 230 are included in towed streamers. Thus, each illustrated sensor position 230 may represent the cross-line position of multiple sensors at different in-line positions on a given streamer. Similarly, the illustrated position of a source 220 may correspond to multiple sources, e.g., included in a towed source array.

In the illustrated embodiment, signals produced by sources 220 travel downwards toward geological surface 212. In the illustrated embodiment, signals reflected from or beneath geological surface 212 travel upwards toward sensors 230. In various situations, geological surface 212 may not be a smooth surface, as suggested by the straight line, but may have irregularities in height. In the illustrated embodiment, they-direction corresponds to the cross-line direction in towing pattern 200. As shown, a CMP location exists between each source-sensor pair in the towing pattern 200. At 216, in the illustrated embodiment, one exemplary CMP location 216 is marked.

In the illustrated embodiment, although there is an average cross-line spacing of 173 meters between adjacent ones of sources 220, the sources are non-uniformly spaced. In the illustrated embodiment, sensors 230 are also non-uniformly spaced, with an average spacing of 100 meters. In the illustrated embodiment, the cross-line spacing between sources 220 from left to right (in meters) is: 169.5, 173.5, 179, 173.5, and 169.5. In the illustrated embodiment, the cross-line spacing between sensors 230 from left to right (in meters) is: 89.5, 120, 88, 111, 86.5, 112.5, 85, 112.5, 86.5, 111, 88, 120, and 89.5. Note that in other embodiments, the spacing between sources 220 (and/or sensors 230) may be strictly-non-uniform. In some embodiments, non-uniform spacing provides better coverage attributes over a wider portion of the survey spread, which may reduce overlap needed between survey passes to achieve desired coverage. In some embodiments, the coverage attributes include one or more of: difference in average spacing of adjacent CMP locations in the cross-line direction between different portions of the survey spread in the cross-line direction, variance in spacing between adjacent CMP locations in the cross-line direction, total width of cross-line coverage provided by adjacent CMP locations in the cross-line direction with spacings between adjacent CMP locations, where the spacings do not meet a threshold spacing value, source-sensor offsets, and/or source-sensor azimuth.

In various embodiments, towing patterns may include more or less than six cross-line positions with sources 220 and more or less than fourteen cross-line positions with sensors 230. Signals from sources 220 penetrate surface 212 and reflect from one or more subterranean surfaces (e.g., geological surfaces below surface 212) to be recorded at sensors 230.

Brief Introduction of FIGS. 3-5

FIGS. 3-5 show exemplary survey views to facilitate explanation of various survey parameters that may be used to determine non-uniform cross-line spacing of survey elements. After briefly describing these figures below, this disclosure returns to FIG. 2 to explain use of these parameters in further detail.

FIGS. 3A and 3B illustrate examples of average spacing and variance in spacing of adjacent CMP locations, respectively. As discussed in further detail below, in some embodiments, average spacing of adjacent CMP locations is a parameter used to determine the non-uniform spacing in the cross-line direction of sources and sensors in a towing pattern for a survey pass in a multi-pass survey. In some embodiments, variance in spacing of adjacent CMP locations is a parameter used to determine the non-uniform spacing in the cross-line direction of sources and sensors in a towing pattern for a survey pass in a multi-pass survey.

In FIG. 3A, rays 320 define two adjacent CMP locations separated by 25 meters and two adjacent CMP locations separated by 50 meters. In this example, the average CMP spacing for these three CMP locations is 37.5 meters. Similarly, rays 330 define two adjacent CMP locations separated by 15 meters and two adjacent CMP locations separated by 20 meters. In this example, the average CMP spacing for these three CMP locations is 17.5 meters, which is less than the average CMP spacing for rays 320. In various embodiments, a survey spread includes more than three CMP locations in the cross-line direction (e.g., more than those shown in FIG. 3A). The illustrated examples are for purposes of illustration and are not intended to limit the scope of the present disclosure.

In FIG. 3B, rays 340 have CMP locations spaced with a larger variance in distance compared to the rays 350. In this example, rays 340 have a CMP spacing variance of 60 meters (one pair of adjacent CMP locations is 15 meters apart and the other pair is 75 meters apart, resulting in a variance of 60 meters). Similarly, rays 350 only have a CMP spacing variance of 5 meters. As discussed in further detail below, variance and averages for CMP spacing may be determined for various portions of a survey spread that may include various numbers of CMP locations.

FIG. 4 illustrates an exemplary source-sensor azimuth 450 with respect to source 220 and sensor 230A. As shown, the azimuth angle is the angle between a reference direction (the in-line direction in this example) and a direction of the offset between a source and sensor (elements 220 and 230A in the illustrated example). The offset refers to the distance between source and sensor in the xy-plane.

In other embodiments, other reference directions may be used such as true north, for example. Although not explicitly marked in FIG. 4, the towed survey spread has various different offsets and azimuths for different sensors 230 with respect to source 220. In the illustrated example, azimuths for sensors 230 in the outer portions of the spread are larger than azimuths of sensors 230 in the center portion of the survey spread. In some embodiments, increasing the number of sources or increasing spacing between sources may decrease the difference between azimuths determined for different cross-line portions (e.g., outer vs. inner portions) of the survey spread.

FIG. 5 illustrates an exemplary towing pattern with uniform cross-line spacing of sources and sensors and narrow-towed sources. In various embodiments, the example non-uniform towing patterns of FIGS. 2 and 7 may provide improved coverage relative to the example of FIG. 5. In the embodiment of FIG. 5, the distance between adjacent CMP locations is 25 meters. Adjacent sources 220 are 50 meters apart in the cross-line direction, while adjacent sensors 230 are 100 meters apart.

The illustrated example of FIG. 5 shows a situation with large differences in source-receiver offsets and azimuths in different parts of the spread. In particular, sensors 230 at the outer portions of the spread have larger source-sensor offsets 452 (e.g., the horizontal distance between source and sensor in the xy-plane) than sensors 230 in the middle portion of the spread.

Exemplary Coverage Parameters

In various embodiments, the non-uniform spacing of sources and sensors for a survey pass in a multi-pass survey is determined (e.g., before the survey pass is performed) based on one or more coverage parameters. Some of these parameters may relate to CMP spacing.

A first example parameter that relates to CMP spacing is difference in average spacing of adjacent CMP locations in the cross-line direction between different portions of the survey spread in the cross-line direction. As discussed above with reference to FIG. 3A, two examples of average spacing of adjacent CMP locations are illustrated in rays 320 and 330.

Turning back to FIG. 2, note that the average CMP spacing in the center of FIG. 2 is smaller than the average spacing on the left or right portions of pattern 200. In some embodiments, using a non-uniform towing pattern with a difference in average CMP spacing below a threshold value, for certain portions of the pattern, may improve width of satisfactory coverage and/or image accuracy.

In various embodiments, parameters may be determined for various different portions of a survey spread from different locations. For example, a portion in the cross-line direction may be from the far left of the spread (e.g., from locations −600 m to −400 m), from a small portion of the towing pattern (e.g., 200 m to 220 m), from the very center of the towing pattern (e.g., −25 m to 25 m), from a large portion of the towing pattern (e.g., −400 m to 400 m), etc. In some embodiments, differences in average CMP spacing (or any other parameter discussed herein) are determined between inner and outer portions of the pattern. Different portions of the same spread may be considered even when the portions have different sizes and/or distances from the center of the spread. Thus, any of various portions may be selected and used to set thresholds relating to acceptable differences between one or more parameters for the different portions. These thresholds may then be used to determine an appropriate non-uniform towing pattern.

In some embodiments, the difference in average CMP spacing between one or more portions of a survey spread meets one or more threshold values. For example, consider a situation where portion A is the center portion of a survey spread, portion B is to the right of portion A and portion C is to the right of portion B. In this example, portions A, B and C have a total width of 100 meters. In addition, in this example, a threshold indicates that portion B should have an average CMP spacing that is less than or equal to twice the average CMP spacing of portion A. In this example, a threshold indicates that portion C has an average CMP spacing that is less than or equal to three times the average CMP spacing of portion A. These example thresholds are included to facilitate explanation of thresholds for difference in average CMP spacing but are not intended to limit the scope of the present disclosure. In some embodiments, the average CMP spacing may increase for portions of the towing pattern that are farther from the center of the survey spread, but may be capped at a threshold difference. In various embodiments, any of various numbers of thresholds may be specified corresponding to the acceptable difference between average CMP spacing for different spread portions. Further, other parameters relating to average CMP spacing may be used to determine a non-uniform spread pattern, such as overall average CMP spacing for the entire spread, for example.

In some embodiments, non-uniform towing patterns may be selected to maximize or minimize any of various parameters discussed herein. In some embodiments, this minimization or maximization may be performed within a solution space that is defined by threshold values for other parameters. For example, a towing pattern with a minimum difference in average CMP spacing between two portions of the spread may be determined within a solution space whose boundaries are defined by a threshold variance and a particular number of sources and sensors. In other embodiments, various parameters may be assigned weights and used to determine towing patterns. In still other embodiments, a number of non-uniform towing patterns may be generated (e.g., pseudo-randomly) and a pattern may be selected that best fits a set of one or more coverage parameters.

A second example parameter that relates to CMP spacing is variance in spacing between adjacent CMP locations in the cross-line direction for all or a portion of the towing pattern. As discussed above with reference to FIG. 3B, two examples of variance in spacing are illustrated in rays 340 and 350.

Turning back to FIG. 2, note that the variance in CMP spacing for the center portion of the survey pattern is smaller than the variance in spacing for the left side or the right side of the survey pattern 200. In some embodiments, maintaining a variance in CMP spacing below a threshold value, for certain portions of the towing pattern, will improve width of desired survey coverage and/or survey accuracy. In contrast to the variance in CMP spacing for FIG. 2, note that the variance in CMP spacing in FIG. 6 is relatively large, particularly in the center of the pattern. Note that portions of the towing pattern with duplicate CMP locations from different source-sensor combinations will have a very large variance in spacing (e.g., because there is a 0 meter difference between duplicate locations and a larger difference between non-duplicate locations).

In some embodiments, threshold values for the variance in spacing of adjacent CMP locations may be specified for an entire survey spread or for one or more portions of the survey spread. For example, consider a portion A of the survey spread that has a total width of 300 meters. Within portion A, the variance in spacing of CMP locations is 25 meters, in this example. Consider another portion B of the same survey pass that has a total width of 150 meters. The variance in spacing of CMP locations within portion B is 40 meters. In this example, the variance of portion B is 1.6 times the variance of portion A, which may satisfy a specified threshold difference in variance between these portions. In other examples, a threshold value for variance in spacing may be specified for the entire survey spread.

A third example parameter that relates to CMP spacing is the width over which cross-line coverage provided by adjacent CMP locations in the cross-line direction meets a spacing attribute (e.g., over which spacings between adjacent CMP locations do not exceed a threshold spacing value). In FIG. 2, for example, if the threshold value for spacing between adjacent CMP locations is 20 meters, the total width of cross-line coverage with spacings smaller than the threshold is almost 800 meters (e.g., from −400 m to 400 m). In some embodiments, the total width of cross-line coverage provided by adjacent CMP locations in the cross-line direction without spacings between the adjacent locations should meet a threshold percentage of the total width of the entire survey pattern. For example, in some embodiments, the total width of cross-line coverage should be at least 80% of the total width of the entire survey pattern.

A fourth example parameter used to determine the non-uniform spacing between sources and/or between sensors is source-sensor offsets, e.g., where the difference between source-sensor offsets for different portions of a towing pattern are within a threshold difference. As discussed above with reference to FIGS. 4 and 5, an example offset distance 452 is shown and is in the xy-plane between source 220 and sensor 230A (e.g., the sensor on the far right of the survey). Offset is a well-understood concept in geophysical surveys, and large differences in offsets for different portions of the towing pattern may be undesirable.

Turning back to FIG. 2, note that offsets between sources and sensors are similar between different portions of the towing pattern. In contrast, for a towing pattern with a smaller number of sources (e.g., less than the survey shown in FIG. 2) such as the towing pattern shown in FIG. 5, the offsets for sensors on the far sides of the survey (e.g., greater than 400 m and smaller than −400 m) are greater than for sensors near the middle of the survey. Note that, although the survey spread is shown from behind, the offset 452 in FIG. 5 may not be parallel to the yz-plane, but may vary with respect to the in-line direction, e.g., depending on the positioning of a sensor on a streamer. Note that in various embodiments with non-uniform crossline spacing herein, the non-uniformity is enforced among a set of sensors/sources that are nominally towed at the same distance in the inline direction from the vessel (e.g., located along a line in the crossline direction y). In contrast, for example, although traditional fan-shaped towing may have different cross-line spacings between sets of sensors at different in-line distances, such patterns are still uniform among a set of sources/sensors at a given in-line distance.

In some embodiments, a threshold similarity in coverage between different portions of a towing pattern is determined based on the difference in source-sensor offsets between one or more portions of the towing pattern. Consider an example where portion A is the far left portion of the towing pattern and has a total width of 200 meters and portion B is directly to the right of portion A with a total width of 300 meters. In this example, the threshold may specify that portion A should have source-sensor offsets (or an average or median source-sensor offset) that are at most one and a half times as large as the corresponding source-sensor offsets in portion B.

A fifth example parameter used to determine the non-uniform spacing between sources and/or between sensors is source-sensor azimuth, e.g., where the difference between source-sensor azimuths is within a threshold value for different portions of a towing pattern. As discussed above with reference to FIG. 4, azimuth refers to an angle between a reference direction and the direction of the offset between source 220 and sensor 230A. Note that, in FIG. 2, the azimuth angles are more uniform throughout the towing pattern, relative to the example of FIG. 5, for example.

In some embodiments, azimuths in one portion of the towing pattern meet a threshold difference in an azimuth angle parameter (e.g., greatest azimuth angle, average azimuth angle, etc.) in comparison with azimuths in one or more different portions of the same towing pattern. For example, the greatest azimuth, average azimuth, etc. for one portion of the pattern may be within a threshold value of the greatest/average azimuth for another portion.

Although specific parameters have been discussed herein, various other parameters relating to CMP spacing, angles of survey pass coverage, source and sensor relative spacing and configurations, etc. may be used in other embodiments. Similarly, any combination of one or more of these various parameters (e.g., those discussed herein or others) may be used to determine the non-uniform spacing between sources and/or between sensors. For example, in some embodiments, one or more parameters are selected and assigned a weight. In some embodiments, these weighted parameters are considered in combination based on their assigned weights to determine the non-uniform spacing between sources and/or between sensors for one or more towing patterns. In some embodiments, different non-uniform towing patterns may be used for different parts of a survey, e.g., if different parts of the survey have different desired coverage characteristics.

Another Exemplary Towing Pattern with Uniform Source and Sensor Spacing

FIG. 6 illustrates sources 220 spaced uniformly with 200 meters between adjacent sources. In the illustrated embodiment, sensors 230 are space uniformly with 100 meters between adjacent sensors. In the illustrated embodiment, the uniform spacing of sources 220 and sensors 230 produces a 50 meter distance between adjacent CMP locations. In the illustrated embodiment, the uniform spacing of sources 220 and sensors 230 causes duplicates in CMP locations for the survey pass for different source-sensor combinations. In the illustrated example, there is substantially more variance between CMP locations in different portions of the pattern relative to the pattern shown in FIG. 2.

An Exemplary Towing Pattern with Sparse-Non-Uniform Source and Sensor Spacing

Figure 7:
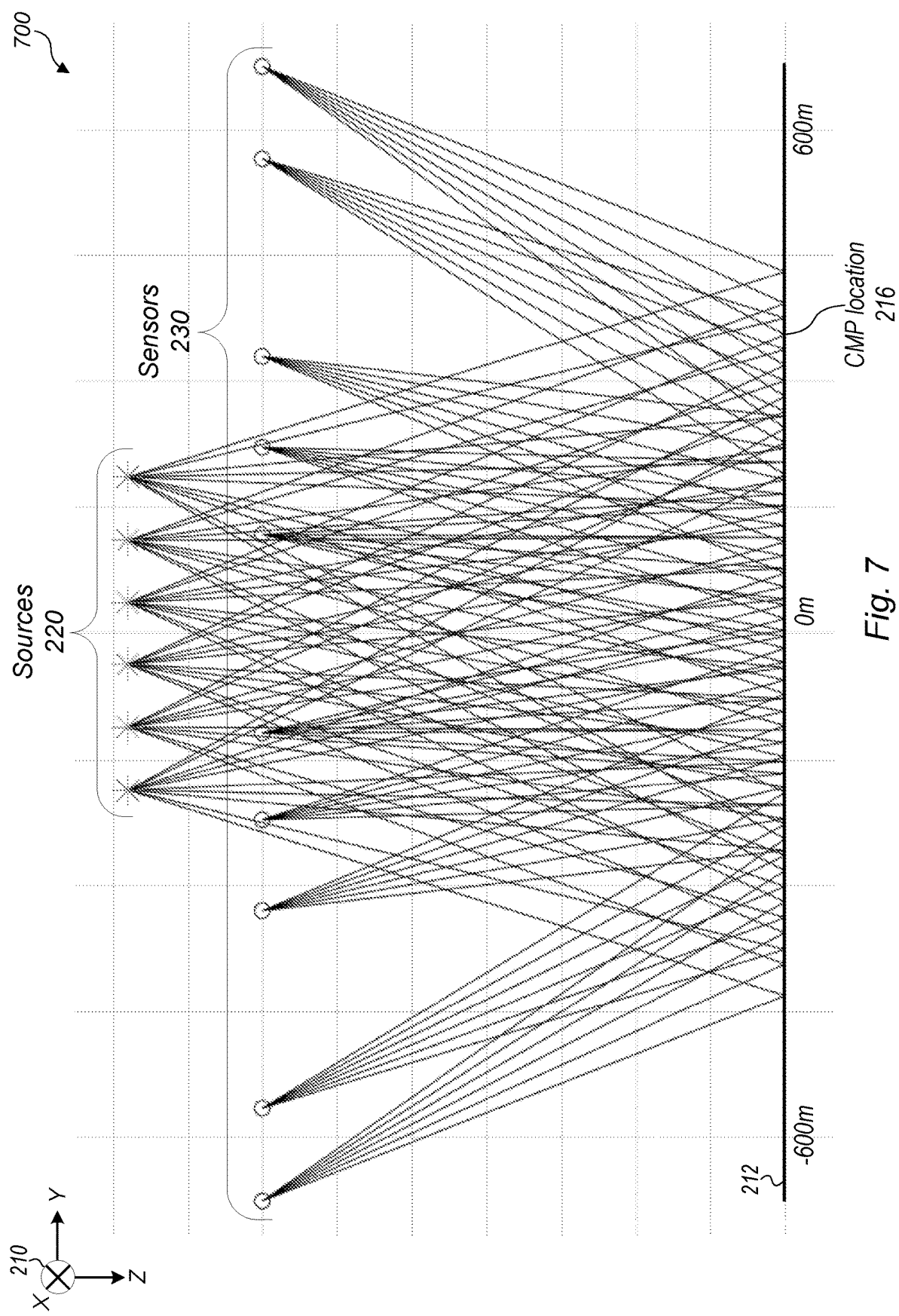
FIG. 7 illustrates an exemplary towing pattern with non-uniform cross-line spacing of six sources and ten sensors, according to some embodiments.

FIG. 7 illustrates an exemplary towing pattern with sparse non-uniform cross-line spacing of six sources and ten sensors, according to some embodiments. In the illustrated embodiment, the sources are spaced non-uniformly with the following distances from left to right between each source (in meters): 100.5, 99, 98, 99, 100.5. In the illustrated embodiment, sensors 230 are spaced non-uniformly with the following distances from left to right between each sensor (in meters): 147, 313.5, 144, 138, 315, 138, 144, 313.5, 147. In the illustrated embodiment, the sources and sensors are sparsely and non-uniformly spaced. The spacing in the illustrated embodiment differs from that shown in FIG. 2 in the number of sensor cross-line positions (e.g., ten instead of fourteen) as well as the larger degree of non-uniformity of spacing between sensor cross-line positions in FIG. 7. For example, in the illustrated embodiment, sensors at cross-line locations −752 m and 753 m are both 313.5 meters from their adjacent neighboring sensor toward the center of the survey pattern. As a result, in the illustrated embodiment, the greater distance in spacing between sensors may produce desired coverage attributes using less streamers (e.g., ten instead of fourteen).

Exemplary Methods

FIG. 8A is a flow diagram illustrating an exemplary method for performing a survey pass using a non-uniform towing pattern, according to some embodiments. The method shown in FIG. 8A may be used in conjunction with any of the computer circuitry, systems, devices, elements, or components disclosed herein, among other devices. In various embodiments, some of the method elements shown may be performed concurrently, in a different order than shown, or may be omitted. Additional method elements may also be performed as desired.

At 810, in the illustrated embodiment, a survey vessel performs a survey pass in a multi-pass marine geophysical survey using a towing pattern for a plurality of sources and a plurality of sensors, where the towing pattern has a non-uniform cross-line spacing between adjacent ones of the sources and where the non-uniform spacing exhibits a CMP spacing attribute for the survey pass in a cross-line direction. In other embodiments, the non-uniform spacing may exhibit one or more other types of attributes (e.g., relating to azimuth or offsets) in addition to or in place of one or more CMP spacing attributes. In some embodiments, a survey vessel performs a second survey pass of the multi-pass survey using a different towing pattern, wherein the different towing pattern has a different non-uniform cross-line spacing between adjacent ones of the sources.

At 820, in the illustrated embodiment, the survey vessel records sensor measurements from ones of the plurality of sensors during the survey pass. In some embodiments, the sensor measurements may advantageously have improved resolution or accuracy, for example, relative to signals recorded using traditional techniques.

In some embodiments, CMP spacing attributes provided by a survey pass in a multi-pass survey include the width of cross-line coverage of a towing pattern of the survey pass with respect to adjacent CMP locations that meet a threshold distance. For example, in some embodiments, the threshold distance is 30 meters. In some embodiments, the total width of cross-line coverage is at least 80% of the total width of the towing pattern (e.g., the total distance between the outermost sensors of the survey pattern). For example, a non-uniform towing pattern for a survey pass in a multi-pass survey meets the following requirements: CMP locations less than 30 meters apart inside of a cross-line coverage width of 980 meters, with a total distance between the outermost sensors in the towing pattern of 1200 meters.

In some embodiments, the CMP spacing attribute for the towing pattern is variance in spacing between adjacent CMP locations in the cross-line direction. In some embodiments, the variance attribute of the towing pattern is defined as meeting a threshold for a first portion of the towing pattern where the threshold is at most twice a variance in spacing between adjacent CMP locations in a second portion of the towing pattern where the variance in spacing in the second portion of the towing pattern is less than 20 meters. Consider an example where the left half of a towing pattern has a variance in spacing of 15 meters, while the right half of the towing pattern has a variance in spacing of 27 meters. In this example, the towing pattern meets the above threshold requirements for variance in spacing between adjacent CMP locations.

FIG. 8B is a flow diagram illustrating an exemplary method for determining a non-uniform cross-line spacing of survey elements, according to some embodiments. The method shown in FIG. 8B may be used in conjunction with any of the computer circuitry, systems, devices, elements, or components disclosed herein, among other devices. In various embodiments, some of the method elements shown may be performed concurrently, in a different order than shown, or may be omitted. Additional method elements may also be performed as desired.

At 830, in the illustrated embodiment, for a geophysical survey pass in a multi-pass survey, a computing system determines a number of sources and sensors in a towing pattern.

At 840, in the illustrated embodiment, for the survey pass in the cross-line direction, the computing system determines a non-uniform cross-line spacing between adjacent ones of the sources in the survey pass based on a common mid-point (CMP) spacing parameter.

In some embodiments, the non-uniform spacing is further determined to provide at least a threshold similarity in coverage, for source-sensor offsets in a particular range, in first and second portions of the towing pattern in the cross-line direction. In some embodiments, the non-uniform spacing is further determined to provide at least a threshold similarity in coverage, for source-sensor azimuths, in first and second portions of the towing pattern in the cross-line direction.

In some embodiments, data obtained from a survey pass with non-uniform spacing of sources and/or sensors is used to generate an image of a geological formation. In some embodiments, this image may be higher quality (e.g., having better resolution and/or accuracy) than an image generated from survey passes with uniform spacing of similar numbers of sources and sensors. In some embodiments, the non-uniform towing pattern may provide improved coverage using a smaller number of survey elements, relative to traditional techniques.

In some embodiments, the CMP spacing parameter for the survey pass is assigned a weight (e.g., significance or percentage). In some embodiments, one or more different CMP spacing parameters are assigned a weight, e.g., to calculate a weighted average of the one or more parameters. In some embodiments, the non-uniform spacing in a survey pass is determined by the weighted average of the one or more parameters.

FIG. 9A is a flow diagram illustrating an exemplary method for performing a survey pass using a non-uniform towing pattern, according to some embodiments. The method shown in FIG. 9A may be used in conjunction with any of the computer circuitry, systems, devices, elements, or components disclosed herein, among other devices. In various embodiments, some of the method elements shown may be performed concurrently, in a different order than shown, or may be omitted. Additional method elements may also be performed as desired.

At 910, in the illustrated embodiment, a survey vessel performs a survey pass in a multi-pass marine geophysical survey using a towing pattern for a plurality of sources and a plurality of sensors, where the towing pattern has a non-uniform cross-line spacing between adjacent ones of the sensors and wherein the non-uniform spacing exhibits a common mid-point spacing attribute for the survey pass in the cross-line direction.

At 920, in the illustrated embodiment, the survey vessel records sensor measurements from ones of the plurality of sensors during the survey pass.

FIG. 9B is a flow diagram illustrating an exemplary method for determining a non-uniform cross-line spacing of survey elements, according to some embodiments. The method shown in FIG. 9B may be used in conjunction with any of the computer circuitry, systems, devices, elements, or components disclosed herein, among other devices. In various embodiments, some of the method elements shown may be performed concurrently, in a different order than shown, or may be omitted. Additional method elements may also be performed as desired.

At 930, in the illustrated embodiment, for a geophysical survey pass in a multi-pass survey, a computing system determines a number of sources and sensors in a towing pattern.

At 940, in the illustrated embodiment, the computing system determines a non-uniform cross-line spacing between adjacent ones of the sensors in the survey pass based on a common mid-point (CMP) spacing parameter for the survey pass in the cross-line direction.

Note that various techniques discussed herein for non-uniform spacing of sensors, sources, or other survey elements may be utilized alone or in combination.

Example Computing System

Various operations described herein may be implemented by a computing device configured to execute program instructions that specify the operations. Similarly, various operations may be performed by circuitry designed or configured to perform the operations. In some embodiments, a non-transitory computer-readable medium has program instructions stored thereon that are capable of causing various operations described herein. As used herein, the term "processor," "processing unit," or "processing element" refers to various elements or combinations of elements configured to execute program instructions. Processing elements include, for example, circuits such as an ASIC (Application Specific Integrated Circuit), custom processing circuits or gate arrays, portions or circuits of individual processor cores, entire processor cores, individual processors, programmable hardware devices such as a field programmable gate array (FPGA) or the like, and/or larger portions of systems that include multiple processors, as well as any combinations thereof.

Figure 10:
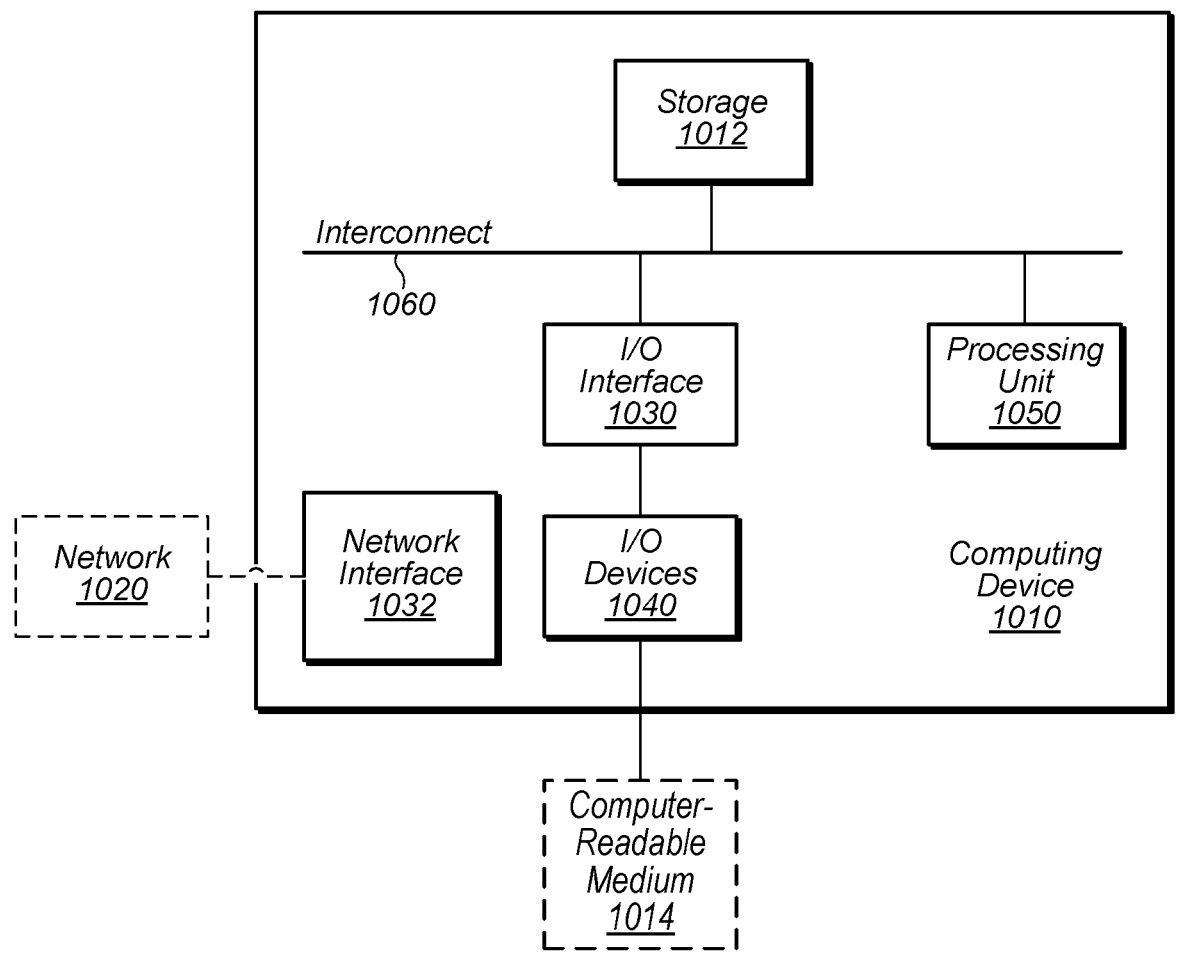
FIG. 10 is a block diagram illustrating an exemplary computing device, according to some embodiments.

Turning now to FIG. 10, a block diagram of a computing device (which may also be referred to as a computing system) 1010 is depicted, according to some embodiments. Computing device 1010 may be used to implement various portions of this disclosure. Computing device 1010 is one example of a device that may be used as a mobile device, a server computing system, a client computing system, or any other computing system implementing portions of this disclosure.

Computing device 1010 may be any suitable type of device, including, but not limited to, a personal computer system, desktop computer, laptop or notebook computer, mobile phone, mainframe computer system, web server, workstation, or network computer. As shown, computing device 1010 includes processing unit 1050, storage subsystem 1012, and input/output (I/O) interface 1030 coupled via interconnect 1060 (e.g., a system bus). I/O interface 1030 may be coupled to one or more I/O devices 1040. Computing device 1010 further includes network interface 1032, which may be coupled to network 1020 for communications with, for example, other computing devices.

As described above, processing unit 1050 includes one or more processors. In some embodiments, processing unit 1050 includes one or more coprocessor units. In some embodiments, multiple instances of processing unit 1050 may be coupled to interconnect 1060. Processing unit 1050 (or each processor within processing unit 1050) may contain a cache or other form of on-board memory. In some embodiments, processing unit 1050 may be implemented as a general-purpose processing unit, and in other embodiments it may be implemented as a special purpose processing unit (e.g., an ASIC). In general, computing device 1010 is not limited to any particular type of processing unit or processor subsystem.

Storage subsystem 1012 is usable by processing unit 1050 (e.g., to store instructions executable by and data used by processing unit 1050). Storage subsystem 1012 may be implemented by any suitable type of physical memory media, including hard disk storage, floppy disk storage, removable disk storage, flash memory, random access memory (RAM—SRAM, EDO RAM, SDRAM, DDR SDRAM, RDRAM, etc.), ROM (PROM, EEPROM, etc.), and so on. Storage subsystem 1012 may consist solely of volatile memory in some embodiments. Storage subsystem 1012 may store program instructions executable by computing device 1010 using processing unit 1050, including program instructions executable to cause computing device 1010 to implement the various techniques disclosed herein. In at least some embodiments, storage subsystem 1012 may represent an example of a non-transitory computer-readable medium that may store executable instructions.

In the illustrated embodiment, computing device 1010 further includes computer-readable medium 1014 as a possibly distinct element from storage subsystem 1012. For example, computer-readable medium 1014 may include non-transitory, persistent, tangible storage such as tape reels, hard drives, CDs, DVDs, flash memory, optical media, holographic media, or other suitable types of storage. In some embodiments, computer-readable medium 1014 may be physically separable from computing device 1010 to facilitate transport. In some embodiments, computer-readable medium 1014 may be used to manufacture a geophysical data product. For example, in some embodiments, seismic data (generated and recorded according to any one of various disclosed embodiments) may be stored on computer-readable medium 1014, thereby completing manufacture of a geophysical data product. Although shown to be distinct from storage subsystem 1012, in some embodiments, computer-readable medium 1014 may be integrated within storage subsystem 1012.

I/O interface 1030 may represent one or more interfaces and may be any of various types of interfaces configured to couple to and communicate with other devices, according to various embodiments. In some embodiments, I/O interface 1030 is a bridge chip from a front-side to one or more back-side buses. I/O interface 1030 may be coupled to one or more I/O devices 1040 via one or more corresponding buses or other interfaces. Examples of I/O devices include storage devices (hard disk, optical drive, removable flash drive, storage array, SAN, or an associated controller), network interface devices, user interface devices or other devices (e.g., graphics, sound, etc.). In some embodiments, the geophysical data product discussed above may be embodied within one or more of I/O devices 1040.

This specification includes references to "one embodiment," "some embodiments," or "an embodiment." The appearances of these phrases do not necessarily refer to the same embodiment. Particular features, structures, or characteristics may be combined in any suitable manner consistent with this disclosure.

It is to be understood that the present disclosure is not limited to particular devices or methods, which may, of course, vary. It is also to be understood that the terminology used herein is for the purpose of describing particular embodiments only and is not intended to be limiting. As used herein, the singular forms "a," "an," and "the" include singular and plural referents (such as "one or more" or "at least one") unless the content clearly dictates otherwise. Furthermore, the word "may" is used throughout this application in a permissive sense (i.e., having the potential to, being able to), not in a mandatory sense (i.e., must). The term "include," and derivations thereof, mean "including, but not limited to." The term "coupled" means directly or indirectly connected.

Moreover, where flow charts or flow diagrams are used to illustrate methods of operation, it is specifically contemplated that the illustrated operations and their ordering demonstrate only possible implementations and are not intended to limit the scope of the claims. It is noted that alternative implementations that include more or fewer operations, or operations performed in a different order than shown, are possible and contemplated.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure. Although various advantages of this disclosure have been described, any particular embodiment may incorporate some, all, or even none of such advantages.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims, and features from respective independent claims may be combined in any appropriate manner and not merely in the specific combinations enumerated in the appended claims.

What is claimed is:

1. A method of manufacturing a geophysical data product, comprising:
    accessing information that indicates a number of sources and a number of sensors to be towed in a towing pattern for a survey pass of a marine geophysical survey;
    specifying the towing pattern at least in part by determining non-uniform crossline spacings between adjacent ones of the sources and between adjacent ones of the sensors, wherein the determining is based on at least the following crossline common midpoint ("CMP") spacing parameters:
        1) a difference in average crossline spacing between adjacent CMP locations in first and second crossline portions of the towing pattern;
        2) a difference in variance of crossline spacing between adjacent CMP locations in the first and second crossline portions of the towing pattern; and
        3) a width of crossline coverage over which crossline spacings between adjacent CMP locations do not exceed a threshold spacing value;
    wherein the specified towing pattern exhibits the determined non-uniform crossline spacings; and
    storing data in a tangible, non-volatile, computer-readable medium that, if accessed by navigation equipment onboard one or more survey vessels, would cause the navigation equipment to maintain the specified towing pattern during the survey pass.

2. The method of claim 1, wherein the determining further comprises:
    minimizing the first and the second crossline CMP spacing parameters; and
    maximizing the third crossline CMP spacing parameter.

3. The method of claim 1, wherein:
    the first crossline portion corresponds to an inner portion of the towing pattern;
    the second crossline portion corresponds to an outer portion of the towing pattern; and
    the inner portion is nearer to a center of the towing pattern than is the outer portion.

4. The method of claim 1, wherein the determining further comprises:
    determining a weighted combination of two or more of the crossline CMP spacing parameters.

5. The method of claim 1, wherein the determining is further based on:
    similarity between source-sensor offsets in the first and the second crossline portions of the towing pattern.

6. The method of claim 5, wherein the determining further comprises:
    ensuring that the similarity meets or exceeds a threshold similarity.

7. The method of claim 1, wherein the determining is further based on:
    similarity between source-sensor azimuths in the first and the second crossline portions of the towing pattern.

8. The method of claim 7, wherein the determining further comprises:
    ensuring that the similarity meets or exceeds a threshold similarity.

9. The method of claim 1:
    further comprising generating a plurality of non-uniform towing patterns pseudo-randomly; and
    wherein specifying the towing pattern comprises selecting one of the plural non-uniform towing patterns based on the one or more crossline CMP spacing parameters.

10. A method of manufacturing a geophysical data product, comprising:
    accessing information that indicates a number of sources and a number of sensors to be towed in a towing pattern for a survey pass of a marine geophysical survey;
    specifying the towing pattern at least in part by determining non-uniform crossline spacings between adjacent ones of the sources and between adjacent ones of the sensors, wherein the determining is based on at least the following crossline common midpoint ("CMP") spacing parameters:
        1) a difference in average crossline spacing between adjacent CMP locations in first and second crossline portions of the towing pattern;
        2) a difference in variance of crossline spacing between adjacent CMP locations in the first and second crossline portions of the towing pattern; and
        3) a width of crossline coverage over which crossline spacings between adjacent CMP locations do not exceed a threshold spacing value;
    wherein the specified towing pattern exhibits the determined non-uniform crossline spacings;
    causing one or more survey vessels to tow the sources and the sensors according to the specified towing pattern during the survey pass; and storing signals generated by the sensors during the survey pass, or data representative of the generated signals, in a tangible, non-volatile, computer-readable medium, thereby completing the manufacture of the geophysical data product.

11. The method of claim 10, wherein the determining further comprises:
minimizing the first and the second crossline CMP spacing parameters; and
maximizing the third crossline CMP spacing parameter.

12. The method of claim 10, wherein:
the first crossline portion corresponds to an inner portion of the towing pattern;
the second crossline portion corresponds to an outer portion of the towing pattern; and
the inner portion is nearer to a center of the towing pattern than is the outer portion.

13. The method of claim 10, wherein the determining further comprises:
determining a weighted combination of two or more of the crossline CMP spacing parameters.

14. The method of claim 10, wherein the determining is further based on:
similarity between source-sensor offsets in the first and the second crossline portions of the towing pattern.

15. The method of claim 14, wherein the determining further comprises:
ensuring that the similarity meets or exceeds a threshold similarity.

16. The method of claim 10, wherein the determining is further based on:
similarity between source-sensor azimuths in the first and the second crossline portions of the towing pattern.

17. The method of claim 16, wherein the determining further comprises:
ensuring that the similarity meets or exceeds a threshold similarity.

18. The method of claim 10:
further comprising generating a plurality of non-uniform towing patterns pseudo-randomly; and
wherein specifying the towing pattern comprises selecting one of the plural non-uniform towing patterns based on the one or more crossline CMP spacing parameters.

* * * * *